Dec. 24, 1940.  G. T. JOHNSON, JR  2,226,060
MANUAL GAUGE HATCH
Filed July 30, 1940  4 Sheets-Sheet 1

Inventor
George T. Johnson Jr
By Clarence A. O'Brien
Attorney

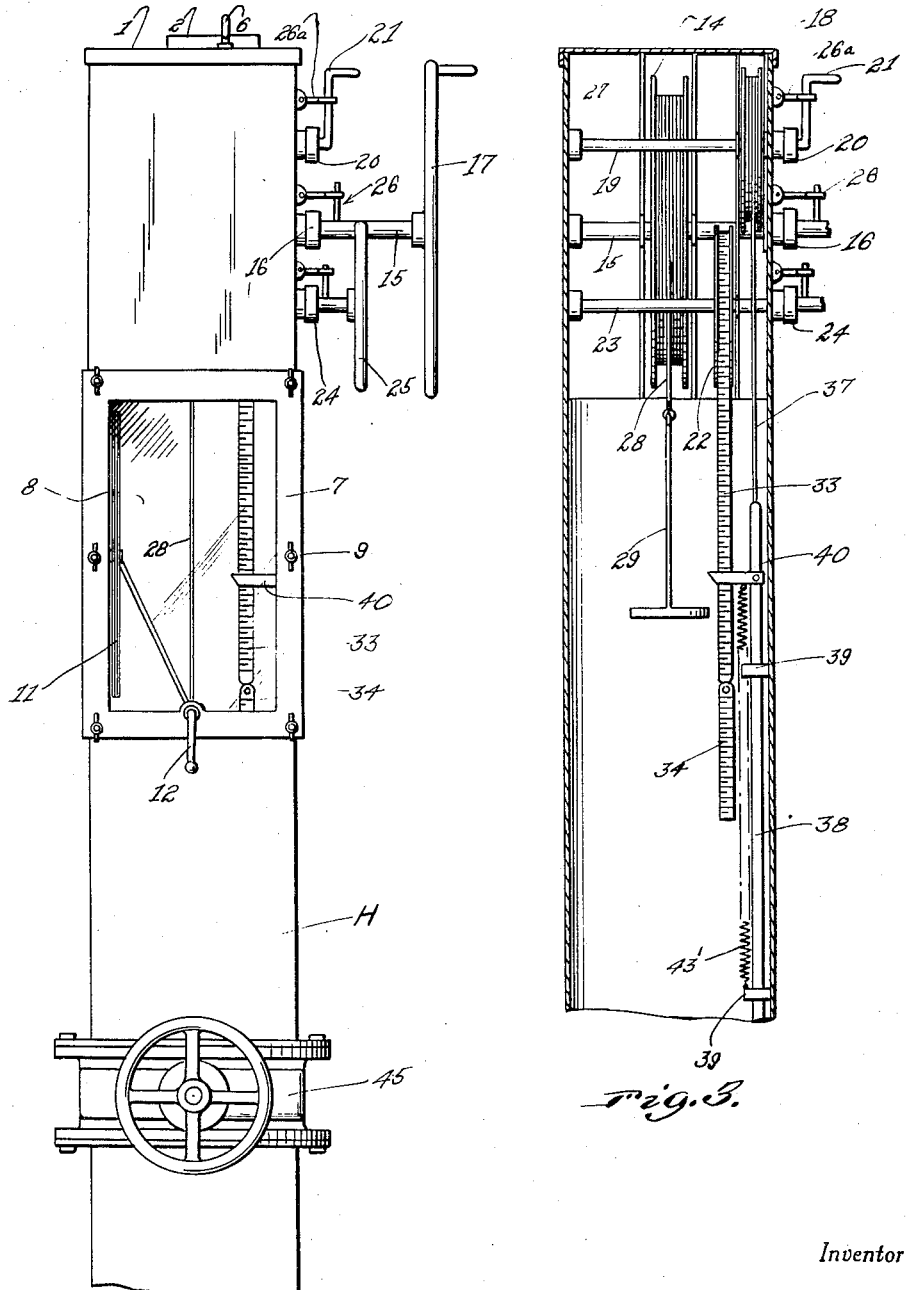

Inventor
George T. Johnson Jr.

By Clarence A O'Brien

Attorney

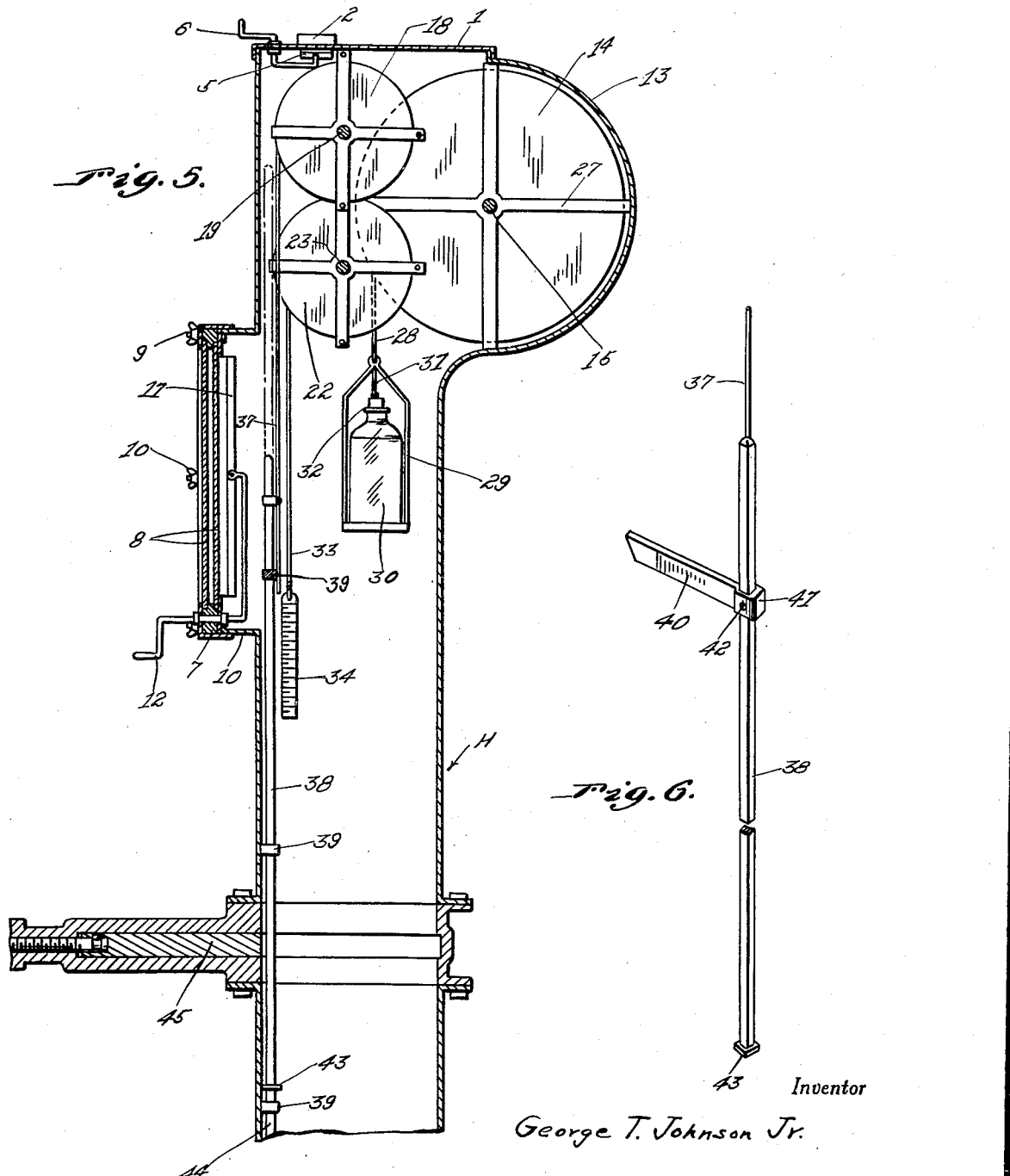

Patented Dec. 24, 1940

2,226,060

UNITED STATES PATENT OFFICE 2,226,060

MANUAL GAUGE HATCH

George T. Johnson, Jr., Houston, Tex., assignor to Jerman Lewis Johnson, Houston, Tex.

Application July 30, 1940, Serial No. 348,525

5 Claims. (Cl. 33—126.5)

This invention relates to a device for gauging liquid or oil in a tank and for taking samples therefrom and also providing means for taking the temperature of the contents of the tank and testing the same for water in the oil.

The general object of the invention is to provide a housing connected with the top of the tank and containing a valve for controlling communication between the tank and the housing, with reels located in the top of the housing and having handles arranged exteriorly of the housing for rotating the reels whereby various parts within the housing can be lowered and raised by rotating the reel.

Another object of the invention is to provide windows whereby the various parts can be observed and readings made from these parts with one of the windows carried by a door which can be easily and quickly opened and closed so that access to the parts within the housing can be had after the valve is closed.

Another object of the invention is to provide a stationary gauge rod extending from the bottom of the tank to a point adjacent the valve with a second rod attached to a flexible member carried by one of the reels and adapted to be lowered into engagement with the top of the first rod to provide a gauge device which is unaffected by any movement of the tank or housing.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 2 is a front view of the housing.

Figure 3 is a longitudinal sectional view through the housing.

Figure 5 is a vertical sectional view through the housing, the section being taken through Figure 2.

Figure 6 is a view of the gauge rod of the housing.

Figure 4:
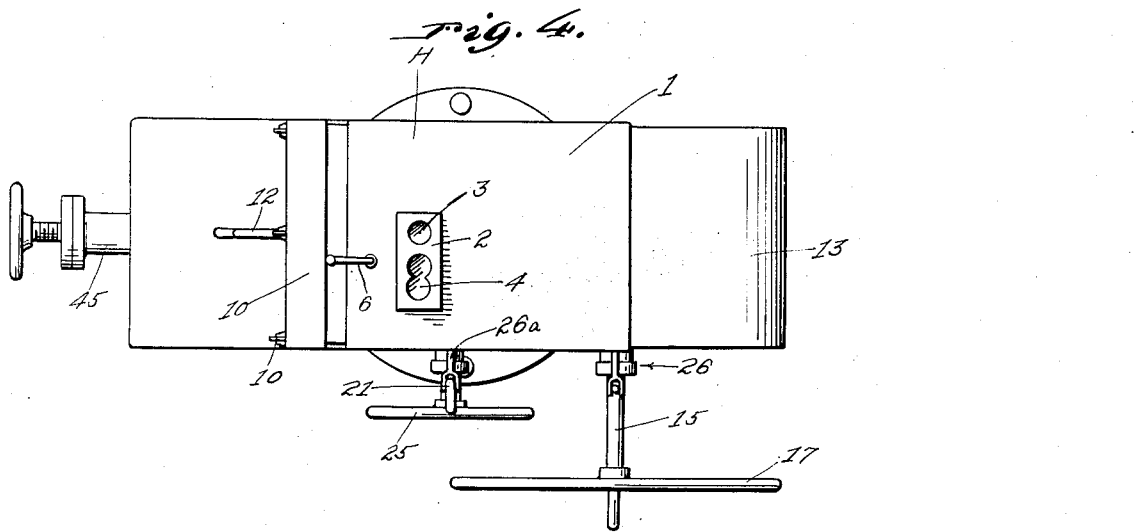
Figure 4 is a top plan view thereof.
Figure 9:
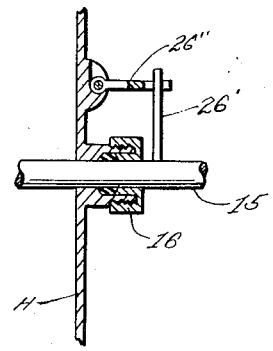
Figure 9 is a detailed vertical sectional view through a side wall of the housing showing the packing means for one of the reel shafts and also the means for holding the shaft against movement.

In these views the letter T indicates the tank and the letter H indicates a small vertically arranged housing having its lower end connected with the top of the tank with the housing in communication with the tank. The cover 1 for the top of the housing has a slightly raised part 2 thereon which has a window 4 therein, preferably having an eyepiece of the type used in field glasses so as to exclude random light when one is looking through the same into the housing and tank. This part 2 also has a second window 3 therein preferably of the shape shown in Figure 4 so that the rays from a flashlight or the like can be directed through the housing into the tank through this window thus permitting a person looking through the window 4 to observe conditions and objects in the housing and tank. The two windows can be wiped from the inside by a wiper shown generally at 5 and engaging the inner sides of the window, the operating handle 6 of the wiper extending through the packing means in the top 1 so that the wiper can be actuated from the exterior of the housing. The window 4, and if necessary the window 3, can be made of double glass with a space between. An opening is formed in a side of the housing and this is covered by a door 7 containing double glass 8 spaced apart as in the first-mentioned window and this door is held in place by the bolts 9 carried by the door frame 10 which projects outwardly from said side of the housing as shown in Figure 5 and passing through holes in the door with cam-shaped wing nuts 10 engaging the bolts so that the door can be easily and quickly closed and opened by manipulating the nuts. The door is also provided with a wiper 11 for wiping the inner glass and this wiper is manipulated from the exterior of the door by means of a handle 12 which passes through a packing gland in the door. The top of the housing is formed with a substantially semi-circular enlargement 13 for providing space for a large reel 14, a portion of the reel extending into the major portion of the housing and said reel is supported by a shaft 15 journaled in the housing and passing through one side thereof and through a packing gland 16, the shaft having a hand wheel 17 attached to its outer end. A smaller reel 18 has its shaft 19 journaled in the housing and one end of the shaft passes through a packing gland 20 and a crank handle 21 is connected to the outer end of the shaft. A third reel 22 has its shaft 23 journaled in the housing with one end passing through a packing gland 24 and a hand wheel 25 is connected to the outer end of the shaft. Each reel is formed with latch means 26 engaging an exterior part thereof as shown in Figure 2 for holding the reel against movement, such latch means being shown in Figure 9 as a pin 26' on the shafts of reels 14 and 22 and a pivoted latch member 26" which when in lowered position will fit over the pin to hold the parts against movement. The latch means for the reel 18 is simply a pivoted latch 26a for engaging the handle 21. Each reel is also provided with a guard member 27 to prevent the lines jumping off the reel and fouling equipment during operation. The locks or latch means are designed to hold the lines and tapes at any desired position during operation.

A flexible member 28 has one end attached to the large reel 14 and if desired this member may be a graduated tape. It carries a holder 29 for a sample receptacle 30 which may be of any desired type and the flexible member is connected by a part 31 to the stopper 32 of the member 30 so that by giving the reel 14 a jerk after the receptacle has been placed in the contents of the tank the stopper will be removed so that some of the contents of the tank can enter the device.

Figure 1:
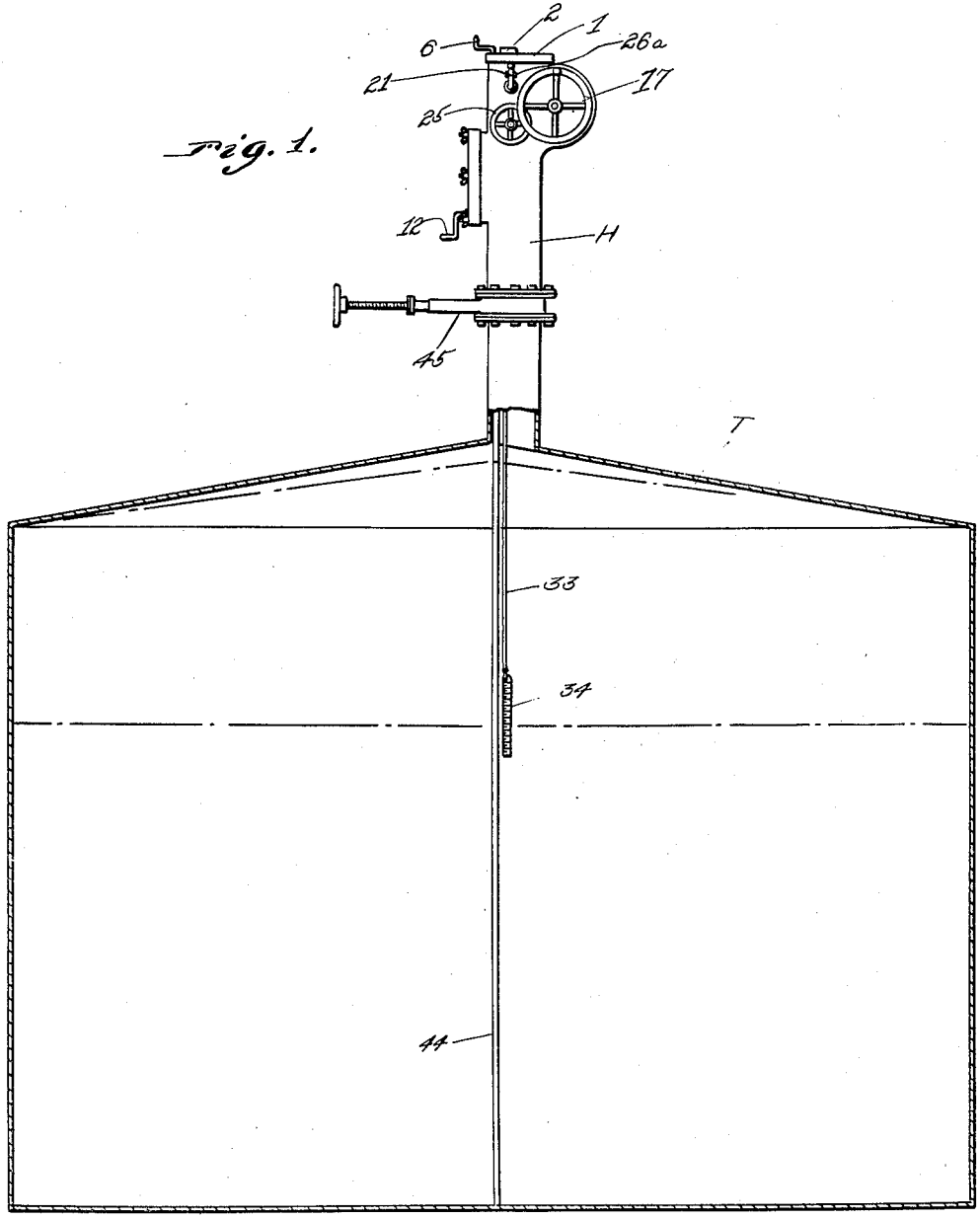
Figure 1 is a view of a tank equipped with the invention, the tank being shown in vertical section and the housing at the top of the tank being shown in elevation.
Figure 7:
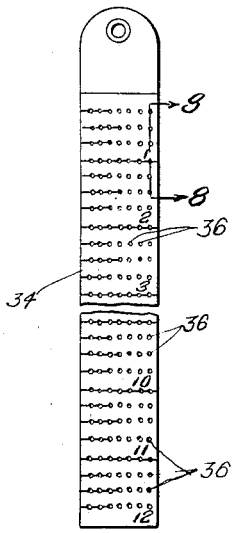
Figure 7 is a face view of the gauge bar.
Figure 8:
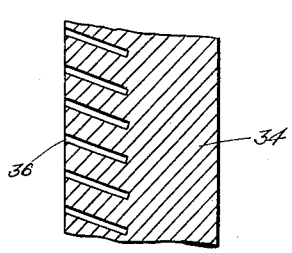
Figure 8 is a section on the line 8—8 of Figure 7.

A graduated tape 33 is carried by the reel 22 and a gauge bar 34 is connected with the lower end of the tape. This bar is graduated as shown in Figure 7 and at each line of graduation a transversely arranged row of holes 36 is made in the bar, the holes sloping downwardly and inwardly from the graduated face of the bar as shown in Figure 8 so that liquid will enter the holes to indicate how far the bar entered the liquid. This bar may be connected with the tape 33 in any suitable manner and it can be removed therefrom if necessary. A flexible member 37 is carried by the reel 18 and a long rod 38 has its upper portion connected with the flexible member 37. This rod is guided for vertical movement by the guides 39 connected with the interior walls of the housing and a horizontally extending arm 40 has an eye 41 at one end through which the rod passes, the parts being of non-circular shape in cross section as shown in Figure 6 to prevent turning movement of the arm on the rod and a screw 42 adjustably holds the arm on the rod. The lower end of the rod has a foot part 43 for engaging a vertically arranged rod 44 when the rod 38 is moved downwardly by the spring 43' which connects the arm 40 with one of the guides 39 in the housing. This arrangement of parts permits the rod 38 to be lifted by turning the reel 18 to cause the flexible member 37 to raise the rod into the housing H and above the gate valve 45 which when closed cuts off communication between the major portion of the housing and the lower part thereof which is connected with the tank so that pressure or vacuum in the tank is prevented from reaching the housing. Then the door can be opened to gain access to the housing without loss of pressure or vacuum in the tank. The rod 44 extends to the bottom of the tank as shown Figure 1 and extends to a point slightly spaced below the gate valve, the upper portion of the rod passing through some of the guide members 39 in the lower part of the housing.

This gauge rod assembly will give a constant gauge height at all times regardless of any tank movement as the spring will hold the rod 38, after the same has been lowered, by turning of the reel 18, in position to rest on the top of the rod 44 and after the arm 40 is adjusted for the particular tank on which the device is used it remains in this position unless some change in structure of the tank is made and the height of the arm 40 from the bottom of the tank can be measured at any time and recorded for permanent use until structural changes necessitate a new height and then, of course, the arm 40 is adjusted to suit the new conditions.

To find the amount of liquid or oil in a tank the door is opened, the bar 34 cleaned and then attached to the tape 33, it being understood that the valve is closed before the door is opened. Then the door is closed and the valve opened and as it was necessary to raise the rod 38 in order to close the valve the reel 18 is turned to lower the rod 38 until the part 43 strikes the upper end of the rod 44. This can be noted by the pull of spring 43' ceasing after the rod 38 engages the rod 44. Then the reel is turned to give a slack to the flexible member 37 so that any tank roof movement can take place without causing the rod 38 to disengage the rod 44. Thus the arm 40 will indicate the correct height from the bottom of the tank regardless of roof movement. Then the handle of reel 22 is unlocked and the tape 33 and bar 34 are lowered until the bar is submerged in the liquid. This is observed through the eye piece or window 4 and if necessary a beam from a flashlight may be thrown on the bar through the window 3. When the bar is seen to strike the liquid surface and this can be readily observed as the bar will cause ripples on the surface when it contacts the same, then the rotary movement of the reel is stopped and the gauge line reading is noted at the arm 40 through the window 8 of the door. The bar is then reeled up until the bar can be seen through the window of the door and the liquid line on the bar is noted by the liquid in the holes 36. If desired grooves can be formed along the graduation line with the outer ends of the holes opening into these grooves.

The tape reading at the indicator arm 40 is added to the bar reading. For instance, say the tape reading is 22'6" and the bar reading is 9¾", then the total is 23'3¾"; this being the distance from the indicator to the liquid level. Supposing tank height is 46'11⅞" then 46'11⅞" less 23'3¾" is 23'8⅛" and this will indicate the amount of liquid in the tank. This operation may be repeated several times by lowering the bar 35 one or two inches deeper into the liquid each time the operation is carried out and repeating the calculation, the result will check.

*Optional method*

Using the bar as a weight to keep the gauge line straight only, the bar is lowered as before until the liquid completely covers the bar and is seen to be on the line, then the line is reeled in after the tape reading is noted at the indicator and the liquid is seen on the tape, the reading at that point on the tape is taken. Suppose the tape reading at the indicator is 26'3¾" and the reading on the tape at liquid immersion point 3'0", then 26'3¾" less 3'0" is 23'3¾" the tank height being 46'11⅞" 23'3¾" is subtracted leaving 23'8⅛" which is the gauge or amount of liquid in the tank. This operation may be repeated immersing the bar slightly deeper each time, the calculations will check.

To secure the temperature of the tank contents the door is opened after closing tank valve 45 and a thermometer is attached to either the gauge line or sample line. The door is then closed, valve opened and the thermometer lowered by the reel as in the gauging operation to the desired level in the tank and left there until liquid temperature has been reached by the thermometer, then it is reeled up to the hatch door, valve 45 closed, and door 7 opened and the thermometer reading noted. The reading may be noted through the glass door also, this eliminating manipulating the valve and door. The operation may be repeated to get check results or take temperatures at other levels. The gauge height rod is not used in temperaturing as such accuracy is not required, the top ten foot strata, the middle point and the bottom ten foot strata are taken and usually only the temperature at the middle point is required.

The sampling operation is performed as follows. The tank valve is closed, door 7 opened, sample container secured to sample line or tape, door 7 closed, valve opened, sample reel hand wheel unlocked and the container lowered to the desired depth as noted on line graduations and the hand wheel jerked to remove cork from neck of container and then the container is allowed to fill at that point, then reeled up to hatch door, valve closed, door opened, sample container stoppered. This is called a spot sample. The other way, the stoppered bottle is lowered to the tank bottom and the cork pulled by jerking sample line and reeling up the container at such a speed that the container is not quite full when the container is drawn from the liquid. The manual operation of the hatch is the same in all cases. This is the all level type sample. Another is to introduce an unstoppered container into the tank in the usual manner and lower to the bottom and reel up at such a speed that the container is not quite full when withdrawn from the liquid, this is the up and down average sample. The speed at which the container is reeled is governed by the type of liquid being sampled.

The test for water is as follows. The bar 34 is coated with a thin film of water finding paste and fastened to the gauge line in the manner used in gauging and lowered into the tank to such a point that the water level intersects the bar at the graduation points, the tape reading at the indicator edge is noted, the bar reeled up and the reading on the bar noted where the water reacted on the paste, the two readings totaled and subtracted from the gauge height, that is, the water gauge in the tank. Example, tape reading say 45′9″ and bar say 8⅜″ added is 46′5⅜″ this taken from the tank height 46′11⅞″ leaves 0′6½″, the amount of water in the tank. Another method is to apply water finding paste to bar in the above manner, lower the bar to the tank bottom then reel up bar and the water reading is the amount shown on bar by the reaction on the paste and the reading is made direct that is the distance from the bottom of the bar up to the water cut, in the above case 0′6½″.

As will be seen this invention provides means whereby a constant gauge height is indicated regardless of roof movement and has separate wheels for gauging and sampling and the operator can readily observe the operation inside the tank through the window and with this invention the operator needs no other devices or accessories to ascertain conditions within the tank.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In combination with a tank, a vertically arranged housing connected with the top of the tank and in communication therewith, a valve adjacent the lower end of the housing for controlling communication between the housing and the tank, a bar having its lower end engaging the bottom of the tank with its upper end extending into the housing adjacent the tank, a rod slidably supported in the housing and when in lowered position engaging the top of the bar, a gauge arm on the bar, a door having a window therein in a side of the housing and through which the part of the housing adjacent the arm can be seen, the door providing access to the interior of the housing, a reel in the housing, means for rotating the reel from the exterior part of the housing, a flexible member wound upon the reel and connected with the rod, and spring means urging the rod into its downward position passing through the valve, and resting on the top of the bar, a second reel in the housing, a tape wound upon the second reel, means for rotating the second reel from the exterior of the housing, said reel supporting the tape when unwound to pass adjacent the arm.

2. In combination with a tank, a housing connected with the top of the tank and in communication therewith, a valve for controlling communication between the housing and the tank, a rod extending from the bottom of the tank into the housing to a point slightly below the valve, a second rod slidably arranged in the housing and when in lowered position engaging the top of the first rod, spring means for holding the second rod in this position, a reel in the housing, a flexible member wound upon the reel and connected with the second rod for raising the same when the valve is to be closed, a second reel in the housing, a tape carried thereby and when extending from the reel being arranged close to the upper part of the second rod, an arm on the second rod for cooperating with the tape, a door in a side of the housing for providing access thereto, and a window carried by the door.

3. In combination with a tank, a housing connected with the top of the tank and in communication therewith, a valve for controlling communication between the housing and the tank, a rod extending from the bottom of the tank into the housing to a point slightly below the valve, a second rod slidably arranged in the housing and when in lowered position engaging the top of the first rod, spring means for holding the second rod in this position, a reel in the housing, a flexible member wound upon the reel and connected with the second rod for raising the same when the valve is to be closed, a second reel in the housing, a tape carried thereby and when extending from the reel being arranged close to the upper part of the second rod, an arm on the second rod for cooperating with the tape, a door in a side of the housing for providing access thereto, a window carried by the door, a window in the top of the housing, and a second window in the top of the housing for enabling a beam of light to be thrown into the housing.

4. In combination with a tank, a housing connected with the top of the tank and in communication therewith, a valve for controlling communication between the housing and the tank, a rod extending from the bottom of the tank into the housing to a point slightly below the valve, a second rod slidably arranged in the housing and when in lowered position engaging the top of the first rod, spring means for holding the second rod in this position, a reel in the housing, a flexible member wound upon the reel and connected with the second rod for raising the same when the valve is to be closed, a second reel in the housing, a tape carried thereby and when extending from the reel being arranged close to the upper part of the second rod, an arm on the second rod for cooperating with the tape, a door in a side of the housing for providing access thereto, a window carried by the door, a window in the top of the housing, a second window in the top of the housing for enabling a beam of light to be thrown into the housing, a large reel in the housing, a flexible member carried thereby, means for attaching a sampler container to the last-mentioned flexible member and means for rotating all the reels from an exterior part of the housing.

5. In combination with a tank, a housing connected with the top of the tank and in communication therewith, a valve for controlling communication between the housing and the tank, a rod extending from the bottom of the tank into the housing to a point slightly below the valve, a second rod slidably arranged in the housing and when in lowered position engaging the top of the first rod, a reel in the housing, a flexible member wound upon the reel and connected with the second rod for raising the same when the valve is to be closed and a door in a side of the housing for providing access thereto, the door being located above the valve, and a window carried by the door whereby the interior of the housing may be viewed without opening the door.

GEORGE T. JOHNSON, Jr.